(No Model.)
W. V. ESMOND.
PHOTOGRAPHIC SHUTTER.
No. 583,700. Patented June 1, 1897.
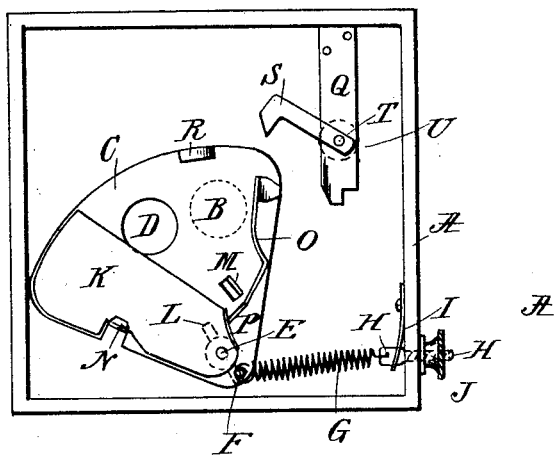
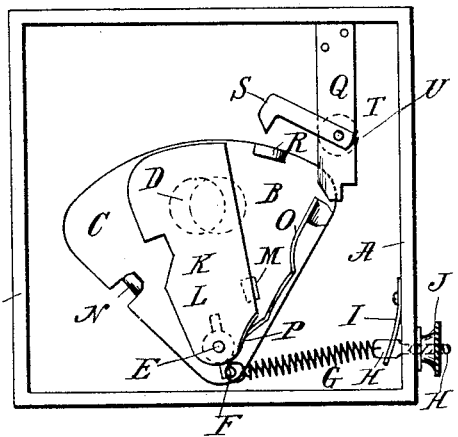
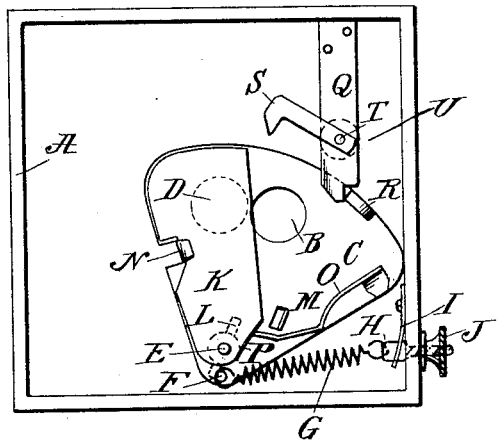
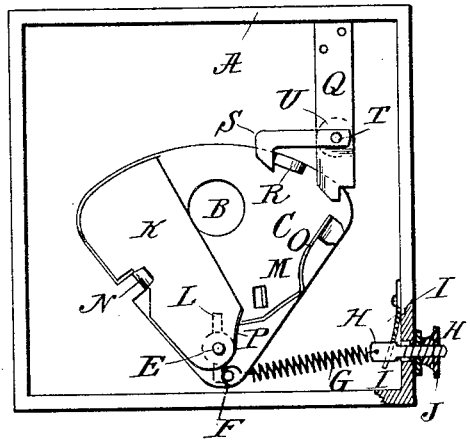
Witnesses
Edward C. Rowland.
H. Bodine Morrison.
William V. Esmond
Inventor
By his Attorney Phillips Abbott

UNITED STATES PATENT OFFICE.

WILLIAM V. ESMOND, OF NEW YORK, N. Y., ASSIGNOR TO THE E. & H. T. ANTHONY & COMPANY, OF NEW YORK.

PHOTOGRAPHIC SHUTTER.

SPECIFICATION forming part of Letters Patent No. 583,700, dated June 1, 1897.

Application filed January 4, 1897. Serial No. 617,884. (No model.)

*To all whom it may concern:*

Be it known that I, WILLIAM V. ESMOND, a citizen of the United States, and a resident of New York city, in the county of New York and State of New York, have invented certain new and useful Improvements in Photographic Shutters, of which the following is a specification.

My invention relates to that class of photographic shutters in which a flat segment or wing having an exposure-opening is pivoted adjacent to the exposure-aperture in the shutter-case or in the side of the camera, as the case may be, there being also a supplemental solid shutter or wing used in conjunction with the apertured wing in such manner that during the movement of the latter in one direction the exposure-opening in it is covered by the supplemental wing, but not in the reverse direction.

The apparatus also embodies devices whereby the tension of the spring which actuates the main or apertured shutter may be increased at will, whereby the device is adapted to make time exposures.

Referring to the drawings hereof, Figure 1 illustrates an elevation of the invention, showing the shutter as inclosed within a suitable case and in its normal position. Fig. 2 illustrates an elevation showing the parts in the position they assume while the shutter is being set. Fig. 3 illustrates an elevation, the same as shown in the other figures, showing the position of the parts when the shutter is set. Fig. 4 illustrates an elevation of the parts, the same as shown in the other figures, illustrating the devices for making time exposures and their operation.

A illustrates the case for the shutter. It may be of any preferred construction and material.

B is the exposure-opening.

C is the main shutter, provided with an exposure-aperture D. This shutter is pivoted, as at E, to the shutter-case or to any other suitable part of the apparatus.

F is a pin or equivalent device attached to the point or lower extremity of the shutter C, to which a spring G is attached, the other end of which connects with a spindle H, which is flattened on its inner end and is received within the bifurcated end of a plate-spring I. The spindle H is threaded with quick-pitch threads and is provided with a thumb-nut J, threaded to correspond, so that a turn or two of the thumb-nut will regulate the tension of the spring G. The function of the spring or plate I is to prevent rotation of the spring H, by reason of its flattened surface being embraced between the bifurcated ends of the plate.

K is the supplemental shutter. It is solid—that is to say, has no opening in it—and is made in the form of a thin flat wing, substantially the same as the main shutter C. It is likewise pivoted upon the pivot E, to which it is made fast, and on the outside of the shutter-case there is a thumb-nut L, which is fastened to the spindle E, and whereby it and the shutter K, to which it is attached, may be readily turned.

M is a stop on the main shutter, and N is another similar stop. The supplemental shutter K strikes against these stops at the limit of its movement right and left, respectively.

O is a spring connected to the main shutter C and adapted to bear at its free end against a flange or upturned plate P made on the supplemental shutter.

Q is a spring fastened at its upper end, the lower end of which is adapted to engage with a detent or stop R made on the main shutter.

S is a latch, which is fastened to a pin T, which passes through the spring Q, and on the outer end of this pin T and on the exterior of the shutter-case or camera, as the case may be, is a push-button U. The spindle T is shouldered against the spring Q, so that when pressure is applied upon the push-button U the said spring will be pressed inwardly and freed from its engagement with the detent R on the main shutter, and likewise upon turning the push-button U the spindle T and the latch S, which is fast to it, will be rotated, so that the latch can be lifted away from or moved into the path of the detent R.

The operation is as follows: Assuming the parts to be in the position shown in Fig. 1, when it is desired to set the shutter the thumb-nut L is turned in such a manner as to move the shutter from left to right. The first operation is to move the supplemental wing K, which, as before stated, is fastened to the spindle E over the exposure-aperture D in the main shutter into the position shown in Fig. 2. When the supplemental shutter engages with the stop M, then the exposure-aperture D in the main shutter is covered light-tight, and the rotating movement is then transmitted to the main shutter, as well as to the supplemental one, so that both of them are carried to the right, as shown in Fig. 2, until finally the detent R comes in contact with the free end of the spring Q, which rides up upon the detent which is inclined on that side, the other side being vertical or substantially so, until finally the parts attain the position shown in Fig. 3, in which the spring Q has passed over and dropped behind the detent R, and then the pressure on the thumb-nut L being removed the supplemental shutter, under the action of the spring O, returns to its normal position, resting against the stop N and uncovering the exposure-aperture D in the main shutter, which, however, by this time has passed so far to the right as to be out of register with the exposure-aperture B in the casing or camera-box. Now to make the exposure the push-button U is pressed inwardly, whereby the free end of the spring Q is disengaged from the detent R, and thereupon the spring G, which has been put under added tension by the above-described movements of the shutter-wings, immediately and quickly swings the shutters in the reverse direction, to wit, from right to left, during which the exposure is made, as the aperture D in the main shutter coincides with the aperture B in the casing or camera-box while in transit, and the exposure can be made more or less rapid, as desired, by increasing the tension of the spring G by turning the thumb-nut J, which draws the spring outwardly, increasing its tension.

To make a time exposure, the operation is substantially the same, excepting that the thumb-nut U is slightly rotated, so as to bring the latch S downwardly from the position shown in Fig. 3 to that shown in Fig. 4, whereby it is adapted to engage with the detent R on the main shutter after its release from the spring Q, and I ordinarily prefer to bend the latch S or otherwise arrange the parts so that it shall lie in the path of the detent R, notwithstanding the fact that the spring Q has been pressed inwardly to release the shutter. It will be observed that the latch S catches the shutter when its aperture is coincident with the aperture in the side of the shutter-casing or camera-box, as the case may be. Thus a time exposure of any desired duration may be made. Thereafter the shutter may be released by again pressing the thumb-nut U inwardly, so as to carry the latch S beyond the detent R, or by revolving the thumb-nut U in the reverse direction, so as to lift the latch S away from the detent.

Among the advantages secured by my invention are the extreme simplicity and inexpensiveness of this shutter, together with its durability, and it will be obvious to those who are familiar with this art that modifications may be made in the details of construction of almost all of the parts without departing from the essence of the invention. I therefore do not limit myself to the details.

I claim—

1. The combination of main and supplemental shutter-wings, both mounted on the same pivot, to which pivot the supplemental wing is attached, steps on the main wing to limit the movement of the supplemental wing, a thumb-nut on the exterior of the shutter-case to turn the said pivot, a separate spring for actuating each wing independently and which act independently of each other, means to give tension to the spring which actuates the main wing, a catch which holds the main wing when at the limit of its movement, and means connected with the catch whereby it may be released from the exterior of the shutter-casing, for the purposes set forth.

2. The combination of main and supplemental shutter-wings, both mounted on the same pivot to which pivot the supplemental wing is rigidly attached, a spring-catch, a detent on the main wing which engages therewith, a push-button on the exterior of the shutter-casing and connected with the spring-catch, a latch attached to the spindle of the said push-button adapted to hold the main shutter for time exposures, a separate spring for actuating each wing independently, and means to give tension to the spring which actuates the main wing, for the purposes set forth.

3. The combination of main and supplemental shutter-wings both mounted on the same pivot, to which pivot the supplemental wing is rigidly attached, a thumb-nut to turn said pivot, stops on the main wing which limit the movement of the supplemental wing, springs which actuate each wing independently, and which act independently of each other, means to give tension to the spring which actuates the main wing, a detent on the main wing, a spring-catch actuated by a push-button connected with it, and a latch fixed on the spindle of the push-button adapted to be rotated into engagement with a detent on the main wing, to secure time exposures for the purposes set forth.

Signed at New York, in the county of New York and State of New York, this 30th day of December, A. D. 1896.

WILLIAM V. ESMOND.

Witnesses:
PHILLIPS ABBOTT,
D. SOLIS RITTERBAND.